United States Patent [19]
Shaffer et al.

[11] 3,819,351
[45] June 25, 1974

[54] APPARATUS FOR PRESS BENDING AN APERTURED GLASS SHEET

[75] Inventors: Paul D. Shaffer, Tyrone; David C. Plank, Altoona, both of Pa.

[73] Assignee: PPG Industries, Inc., Pittsburgh, Pa.

[22] Filed: Feb. 6, 1973

[21] Appl. No.: 330,146

[52] U.S. Cl............................ 65/273, 65/275, 65/287
[51] Int. Cl............................................. C03b 23/02
[58] Field of Search .............. 65/273, 275, 287, 291

[56] References Cited
UNITED STATES PATENTS
1,633,117   6/1927   McDanal ........................... 65/287 X
3,367,764   2/1968   Seymour ............................ 65/273 X
3,388,983   6/1968   Richardson ....................... 65/275 X Primary Examiner—Arthur D. Kellogg
Attorney, Agent, or Firm—Edward I. Mates; Thomas F. Shanahan

[57] ABSTRACT

In a press bending mold for shaping an apertured glass sheet comprising a relatively flexible metal plate (also known as a shaping plate) having a shaping surface complementary to that desired for the glass sheet, a relatively rigid member and means connecting said plate in spaced relation to the rigid member, an aperture is provided in the relatively flexible metal plate to face a given critical aperture of the glass sheet to be shaped by press bending. The connecting means which are individually adjustable between the plate and the rigid member for altering the shape of the flexible metal plate relative to the relatively rigid member do not control the perimeter surrounding the critical apertures of sheets as well as desired. Therefore, the present invention provides a special plug for each aperture in the shaping plate. An adjustment member is secured to each plug for individual adjustment relative to the relatively rigid member so that the position of each plug is adjustable relative to the critical portions of the shaping surface facing the critical apertures of the apertured glass sheet undergoing shaping by press bending. One or both press bending molds of press bending apparatus may be apertured and adjustable plugs provided for each aperture. Means is provided for maintaining each plug in proper orientation. If the press bending apparatus comprises a convex and a concave mold, the apertures in the concave mold are preferably slightly larger than the apertures in the convex mold.

10 Claims, 3 Drawing Figures

APPARATUS FOR PRESS BENDING AN APERTURED GLASS SHEET

BACKGROUND OF THE INVENTION

1. Field of the Invention

The present invention relates to shaping glass sheets and particularly to an apparatus for shaping glass sheets by a press bending operation that is relatively inexpensive to fabricate, yet capable of producing bent glass sheets on a mass-production basis within precise tolerances. Though the present invention originated to solve problems existing in the shaping of glass sheets, it is understood that the principles of the present invention may be employed for shaping sheet material other than glass.

Glass sheets or plates have been bent by supporting the sheet to be bent between a pair of glass shaping members while at a temperature sufficiently high to be deformable by pressurized contact between a pair of glass shaping members having major, complementary shaping surfaces conforming to the shape desired for the bent glass. In the past, the glass shaping members were of either solid metal or refractory members or outline metal members covered with suitable material to insulate the glass from direct contact with the metal so as to avoid chill cracking.

2. Description of the Prior Art

If the glass is contacted around its marginal portion only as disclosed in British Pat. No. 880,115 to St. Gobain, only the shape of the marginal edge is controllable within tolerance. The shape of the interior portion is not controlled.

A press bending mold may engage one surface only of the heat-softened glass interiorly of a pair of opposing frames to help form the central portion of the heat-softened glass as disclosed in U.S. Pat. No. 3,123,459 to Hens, or the opposite surfaces of the glass may be engaged simultaneously by a pair of pressing plates of complementary shape.

Glass shaping members fabricated of solid material are costly to fabricate. The fabricated parts are not suitable to produce patterns other than the one for which they are originally made, except for a family of glass sheets of uniform radius of curvature but of different sizes.

U.S. Pat. No. 3,367,764 to Seymour provides glass shaping apparatus of the press bending type that engages the opposite surfaces of the glass substantially equally during the shaping operation, that is easily adjustable to change its shape in the event glass is bent slightly out of tolerance without requiring dismantling of the entire apparatus, and that is capable of simple adjustment to produce several different configurations that are not too dissimilar from one another.

The Seymour patent provides apparatus for bending a heat-softened glass sheet by sandwiching a glass sheet in pressurized engagement between glass facing surfaces of a pair of glass shaping members having major, complementary shaping surfaces conforming substantially to the shape desired for the bent glass sheet and relatively movable between a retracted position and a glass engaging position.

A glass shaping member of the Seymour patent comprises a relatively flexible shaping plate of metal having a pressing face whose shape approximates that of the shape desired for the glass sheet after bending. The relatively flexible shaping plate extends substantially continuously throughout substantially its entire extent and has sufficient rigidity to resist deformation during pressurized engagement against a heat-softened glass sheet.

The apparatus also comprises a relatively rigid member in the form of a metal plate having an area at least substantially coextensive with that of the relatively flexible metal plate located in spaced relation behind said relatively flexible metal plate. Attachment means is distributed throughout the extent of the relatively flexible metal plate and the relatively rigid metal plate for connecting the plates in spaced relation to one another, for insuring positive alignment of the central portion of the shaping plate to the corresponding portion of the rigid plate while permitting the shaping plate to expand thermally without distorting from its desired local configuration, and for making slight alterations in the shape of the relatively flexible metal plate without altering the configuration of the relatively rigid metal plate. The space between the shaping plate and the rigid plate permits access to adjust the attachment means. Such adjustment changes the local contour of the shaping plate by altering the distance between the shaping plate and the rigid plate in the vicinity of the attachment means.

While the apparatus patented by Seymour is the best yet available for shaping glass sheets to different shapes, the adjustment members are arranged in a checkerboard pattern with each adjustment member spaced from another adjustment member by about 4 inches in order to permit access for an adjustment tool. When press bending apparatus is used to shape apertured glass sheets having one or more apertures located in a region of sharp bending, the adjustment members are usually not located in positions where critical adjustments may be made about the periphery of the critical apertures, which are most likely to be shaped out of tolerance limits. These apertures are needed in movable windows, such as side windows in automobile doors and the like, to receive actuating mechanisms that help open and close the windows.

The present invention solves a need for providing means to adjust the critical portions of the shaping face of a press bending mold, namely, the portions that apply pressurized engagement against the peripheral portion of critical apertures in apertured glass sheets to be shaped by press bending.

SUMMARY OF THE PRESENT INVENTION

The present invention provides means for locally adjusting the shaping face of a press bending mold in the vicinity of the periphery of any critical aperture (usually one located in the vicinity of a sharply bent region of the glass sheet) although the present invention may be used to shape an apertured glass sheet by providing a localized shape adjustment member in the vicinity of each aperture.

In a specific embodiment of the present invention, an aperture is provided in the relatively flexible metal plate in each region facing a critical aperture drilled through the glass sheet to be shaped by press bending, a plug having an area substantially coextensive with that of the aperture is supported within said aperture by a plug attachment member adjustably secured to the rigid member to which the attachment means of the Seymour patent adjustably secure the relatively flexible metal plate.

Each plug has its shaping surface conforming exactly to the shape desired for the bent glass sheet surrounding the given aperture. When the position of the plug attachment is properly adjusted, the plug attached thereto provides more precise control of the shape imparted to the glass sheet in the vicinity of a given aperture than is possible with the adjustment means provided by the apparatus of the aforesaid Seymour patent.

In order to understand fully the present invention, a description of a particular embodiment thereof will now be described.

BRIEF DESCRIPTION OF THE DRAWINGS

In the drawings which form part of the description of this illustrative embodiment and wherein like reference numerals refer to like structural elements.

DESCRIPTION OF A PREFERRED EMBODIMENT

Figure 1:
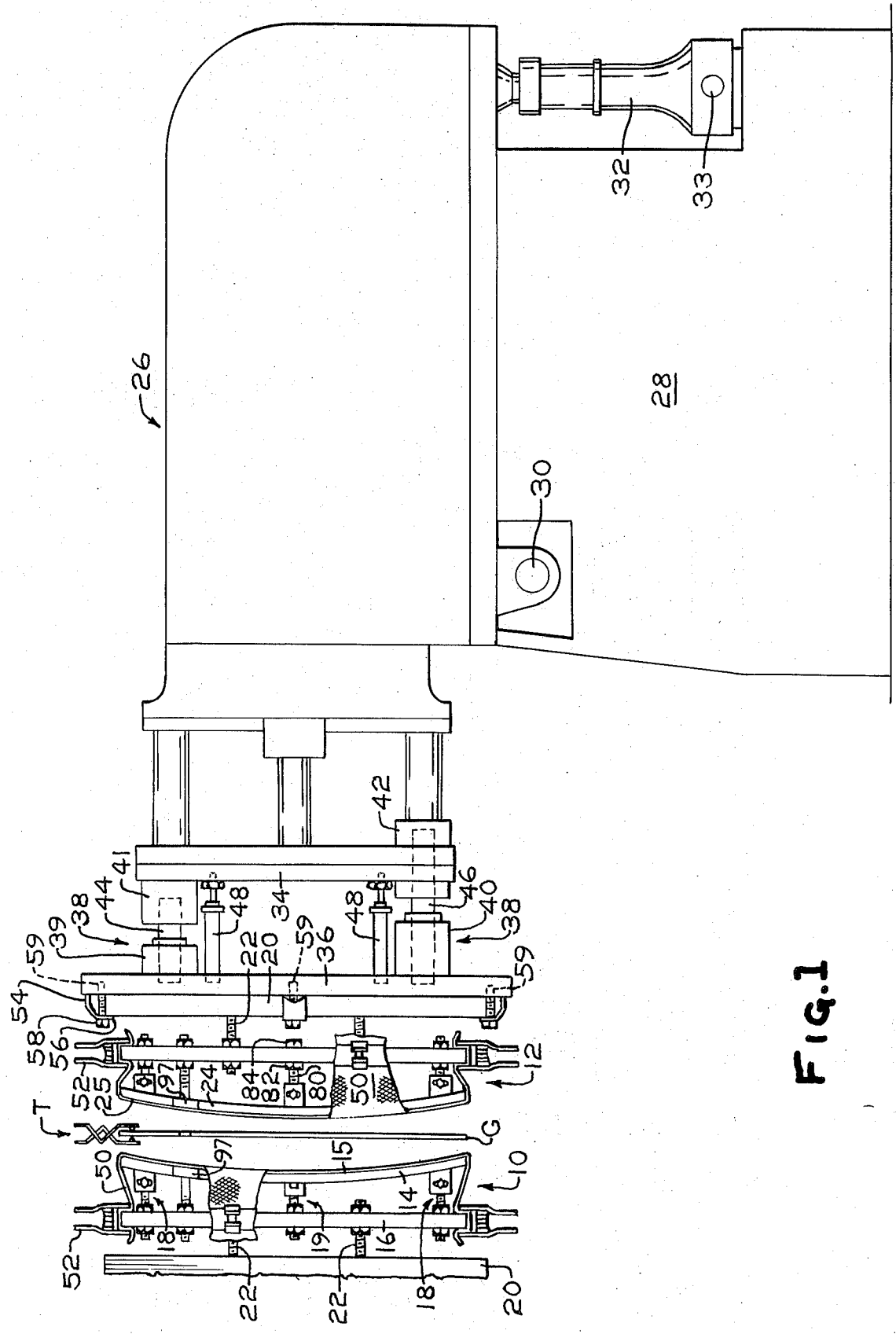
FIG. 1 is a fragmentary end elevation of an embodiment of the present invention with its cover member partially removed showing how the glass shaping member is attached to actuating mechanism.
Figure 2:
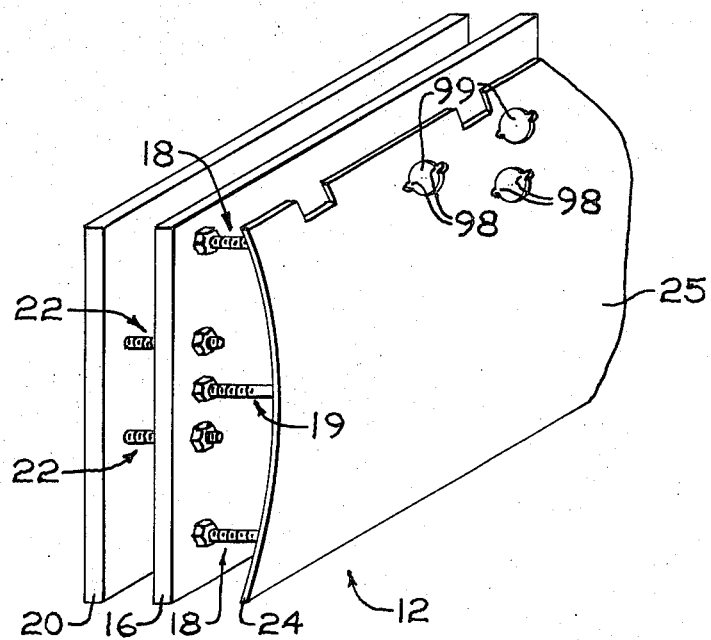
FIG. 2 is a perspective schematic, fragmentary view of the apparatus of FIG. 1 showing one glass shaping mold with its cover completely removed to disclose further elements of the construction.

A glass shaping apparatus illustrating the present invention comprises a concave shaping member 10 and a convex shaping member 12. As seen in FIG. 1, the concave shaping member 10 comprises a relatively flexible shaping plate 14, having a concave shaping surface 15 facing forward in one direction. A relatively rigid member in the form of a metal plate 16 is disposed in spaced relation behind the shaping plate 14 by means of a series of attachment means 18 distributed throughout the extent of the plates and additional centrally disposed attachment means 19 to connect one plate to another in a manner described in detail in said U.S. Pat. No. 3,367,764 to Seymour. A rigid back plate 20 is connected in spaced relation to the rigid metal plate 16 by a plurality of rigid, elongated, adjustable connectors 22.

The convex shaping member 12 comprises a relatively flexible shaping plate 24 having a shaping surface 25 complementary to that of the concave shaping member 10. A relatively rigid member in the form of another metal plate 16, attachment means 18 and 19 connecting the relatively rigid metal plate 16 to the rear of and in spaced relation to shaping plate 24, a rigid back plate 20 and connecting means 22 connecting the rigid back plate to the relatively rigid metal plate 16 are associated with the convex shaping member 12 in a manner similar to how the like elements are associated with the concave shaping member 10.

A piston assembly 26 shown in FIG. 1 attached to the rear of convex shaping member 12 is provided for each of the shaping members 10 and 12. Each piston assembly 26 is supported on a piston support structure 28. The shaping member 10 or 12 and its attached piston assembly 26 is pivotally mounted about a pivot 30. A vertically adjustable piston 32 whose housing is pivotally mounted to the piston support 28 at pivot 33 supports the rear end of piston assembly 26. Vertical adjustment of piston 32 permits the entire shaping member and its actuating piston assembly 26 to pivot with respect to the axis of pivot 30 to orient the shaping members in a manner well known in the art. This enables the shaping surface of the member to be oriented at any angle desired with respect to the vertical plane in which a glass sheet G is suspended from tongs T for the shaping operation.

The front end of the piston assembly 26 is attached to a piston actuated plate 34. The latter is aligned with a piston plate 36 through a plurality of alignment couplings 38. The alignment couplings 38 between plates 34 and 36 comprise guide blocks 39 and 40 attached to the rear of plate 36 and guide blocks 41 and 42 aligned axially with guide blocks 39 and 40, respectively, and attached to plate 34. Rods 44 extend loosely between aligned guide blocks 39 and 41, while rods 46 extend loosely between aligned guide blocks 40 and 42. A spring loaded coupling 48 is connected between the piston actuated plate 34 and the piston plate 36 in the vicinity of each alignment coupling 38.

Each shaping member is provided with a cover 50 in direct contact with the shaping surface 15 or 25. The cover 50 is preferably of a material that does not harm glass at elevated temperatures. Preferably, the material for the cover is a stretchable fiber glass cloth composed of texturized yarns. A number of closely spaced clamps 52 are mounted around the periphery of the relatively rigid metal plate 16 to clamp the cover 50 in position where it is in unwrinkled condition against the shaping surface 14 or 25 which it covers.

While the present invention is susceptible of making slight modifications in the shaping surfaces by changing the contour of the relatively flexible shaping plates 14 and 24, it is also desirable to provide means for rapidly changing from one glass shaping member to another when the pattern to be manufactured differs radically from one previously manufactured. This rapid change is accomplished by utilizing a series of brackets 54 having an L-shape in cross section and provided with a flange 56 extending over the marginal portion of the front surface of each rigid back plate 20. Flange 56 is apertured to receive a bolt 58 threaded into a threaded recess 59 contained in plate 36. Thus, the rigid back plate 20 of each shaping member 10 or 12 may be quickly clamped to the piston plate 36 and replaced with another member having the desired configuration when a radical change in pattern is called for.

The above construction is far easier to replace than heavy massive solid shaping members used previously.

Figure 3:
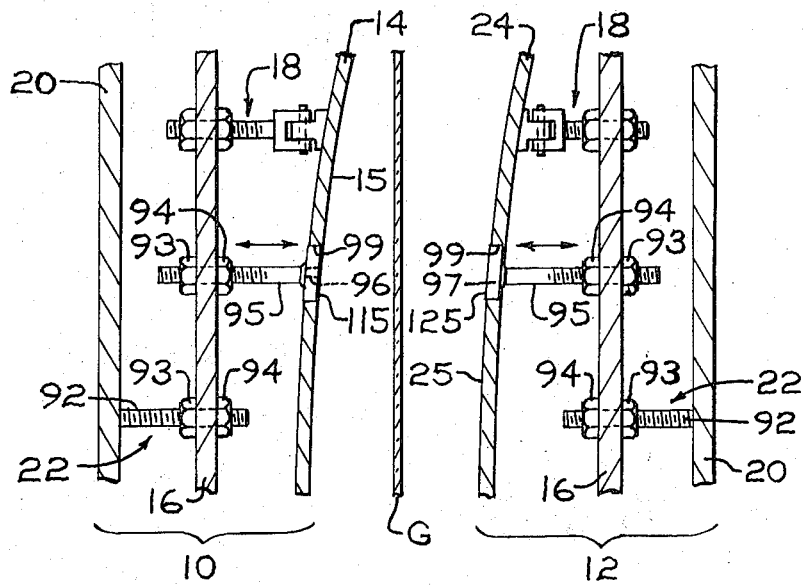
FIG. 3 is an exploded fragmentary sectional view of a pair of shaping members, one having a convex pressing face, the other having a concave pressing face, with the covers removed to show how the elements are attached to one another to provide the results of the present invention.

The connecting means 22 connecting the relatively rigid metal plate 16 in spaced relation to the rigid back plate 20 comprises a series of threaded rods 92 (FIG. 3) attached at their rear end to plate 20 and with their forward end extending through apertures in plate 16. A pair of lock nuts 93 and 94 (FIG. 3) and washers rigidly secure the front end of each threaded rod 92 to the front and rear surface of plate 16, respectively, to secure plates 16 and 20 in adjustably spaced relation to one another.

The purpose of spacing the rigid plates 16 from the shaping plates 14 or 24 is to provide access for tools to adjust the length of the adjustment means 18 and 19. The latter interconnect different portions of the plate 16 which is relatively rigid and the relatively deformable shaping plate 24 or 14. By adjusting the location of lock nuts 82 and 84 along an externally threaded shaft 80, stresses are established in the relatively flexible metal shaping plate 14 or 24 to adjust their respective shaping faces 15 or 25 locally to the shape desired for the glass to be bent without changing the contour of the relatively rigid plate.

While the terms "relatively flexible" and "relatively rigid" have been used to describe the metal plates forming part of the present apparatus, it is understood that the rigidity and the flexibility of the metal plates are with respect to one another and that the relatively flexible metal plates are substantially rigid compared with the rigidity of a heat-softened glass sheet which undergoes shaping by sandwiching the sheet between a pair of shaping members in pressurized contact. The rigidity of the shaping plates 14 and 24 is enhanced by the rigidity of the attachment means 18 and 19 along its axis extending between the shaping plate and the rigid plate 16.

In a typical apparatus for bending glass sheets up to thicknesses of ¼ inch, the relatively flexible plates 14 and 24 were constructed of ¼ inch thick hot rolled steel plates that had been shaped previously to a 60 inch radius bend about one axis and a 1440 radius bend about the other axis. The relatively rigid metal plates 16 were slightly larger in area than the shaping face of the relatively flexible shaping plate 14 and were formed of ½ inch thick cold rolled 1018 carbon steel. The latter imparted stiffness and rigidity to the entire assembly.

Further rigidity for the relatively flexible shaping member was provided by the reinforcement provided through the attachment means 18 and 19 which interconnected the relatively flexible metal plate 14 or 24 and the relatively rigid metal plate 16. Thus, the relatively flexible metal plates 14 and 24 which provide the pressing faces 15 and 25, respectively, whose shape approximates that of the shape desired for glass sheet after bending, had sufficient rigidity to resist deformation during pressurized engagement against the opposite surfaces of heat-softened glass sheets.

The attachment means permit the shaping plates or face plates 14 and 24 to be fabricated to the approximate curve desired. These approximate shapes are then adjustable by locating the attachment means at strategically located positions behind the curved shaping plates or face plates 14 and 24. The attachment means 18 hold the curved face plates 14 and 24 sufficiently rigid to withstand without deformation the pressure strains arising during continuous production of bent glass sheets. This plate rigidity with freedom of movement responsive to heat stresses is obtained through engineering design of the assembly of the attachment means and by the number, location, and spacing of adjustment screws forming part of the attachment means 18. Each curved configuration must be analyzed as to the best location, spacing, and orientation of slots to permit the screws to provide satisfactory production.

The apparatus described previously conforms to that of U.S. Pat. No. 3,367,764 of Samuel L. Seymour. The present invention provides the Seymour apparatus with more precise adjustability in certain critical regions facing given apertured portions of glass sheets to be shaped by press bending.

According to a preferred embodiment of the invention, an aperture 99 of approximately circular configuration is provided in each relatively flexible metal plate 14 or 24 in each area that faces a critical aperture in a glass sheet to be shaped by press bending when said glass sheet is properly aligned between press bending molds 10 and 12. Each aperture 99 has a pair of diametrically opposed extensions 98.

A plug 97 having diametrically opposed tabs 96 results when an aperture 99 with its extensions 98 is removed from a relatively flexible shaping plate 14 or 24. Furthermore, each plug 99 has a shaping face 115 or 125 whose shape conforms to the shape of the respective shaping face 15 or 25 of the respective flexible shaping plate 14 or 24 from which it is fabricated in the vicinity of the respective aperture 99.

A threaded shaft 95 is attached to the rear face of each plug 97. Adjustment nuts 93 and 94 are mounted on the threaded shaft 95 to the rear and to the forward side, respectively, of relatively rigid member 16. Each threaded shaft 95 serves as a plug attachment member and the threads on each shaft 95 cooperate with the adjustment nuts 93 and 94 mounted thereon to provide adjustment means for adjusting the relative position of the plug attachment member 95 relative to the relatively rigid member 16.

Since the shaping faces 115 and 125 of the respective plugs 97 are shaped to conform to the respective shaping faces 15 and 25 of the respective press bending molds 10 and 12, the tabs 96 of the plugs 97 are received within the extensions 98 of the apertures 99 to maintain the plugs 97 in proper orientation relative to the respective relatively flexible shaping plates 14 and 24. Therefore, whenever adjustment nuts 93 and 94 are rotated along a threaded shaft 95 to move an attached plug 97 inward or outward relative to the relatively flexible shaping plate 14 or 24, the orientation of the plug 97 relative to the axis of threaded shaft 95 is not changed.

A typical construction of a preferred embodiment of the present invention involved cutting out a 2 inch diameter circle with diametrically opposed extensions of about ¼ inch diameter from the relatively flexible shaping plate 24 of the pressing mold 12 with a convex shaping surface in alignment with the center of each critical aperture in the glass sheet undergoing processing. An aligned circle having 2 ¼ inch diameter with diametrically opposed extensions of about ¼ inch diameter was cut from the shaping plate 14 of the pressing mold 10 with a concave shaping surface. The portion cut and removed from each relatively flexible shaping plate 14 or 24 formed a plug 97. An externally threaded metal rod ½ inch in outer diameter was attached to the center of each plug 97 and a hole ⅝ inch in diameter was cut and removed from each rigid member 16 directly aligned with the aperture 99 that remained in shaping plate 14 or 24 when the plug 97 was removed.

The threaded shaft 95 with plug 97 rigidly attached thereto was provided with a lock nut 94 one inch wide and internally threaded to fit on shaft 95 and inserted through the ⅝ inch opening in member 16. Additional lock nut 93 (identical to lock nut 94) was threaded onto shaft 95 and the positions of lock nuts 93 and 94 adjusted to fix the position of shaping face 115 or 125 relative to the respective shaping face 15 or 25 of the respective shaping plate 14 or 24.

The apertures 99 cut and removed from the shaping plate 14 of the press bending mold 10 having a concave shaping surface 15 were slightly larger than the apertures 99 cut and removed from the shaping plate 24 of the press bending mold 12 having a convex shaping surface. This slight difference in dimension insured that the apertured glass sheet to be shaped was positively shaped by the press bending mold 12 having a convex shaping face 25.

In case the press bending apparatus comprises a concave mold of frame-like configuration and a convex mold with a substantially continuous shaping surface of approximately the same or greater areal extent, apertures are provided in the mold with the continuous convex shaping surface to form the plugs and a plug attachment member and adjustment means for adjusting the position of each plug attachment member provided only for each plug formed from the press bending mold having a convex shaping face.

A typical preferred embodiment of the present invention has been described for purposes of illustration. It is understood that various changes may be made from the illustrative preferred embodiment without departing from the spirit of the invention as defined in the claimed subject matter which follows. Some of these modifications may include using one piston to actuate one shaping member only instead of actuating both shaping members, orienting the shaping members to shape heat-softened glass sheets supported in horizontal or oblique planes of support as well as in the vertical plane disclosed, shaping glass sheet supported by their bottom edge or by gaseous support in either horizontal or vertical or oblique orientation and many other well-known modifications of glass shaping apparatus wherein the present invention is susceptible of use.

We claim:

1. In apparatus for press bending a heat-softened glass sheet having at least one aperture drilled therethrough wherein said glass sheet is sandwiched in pressurized engagement between a pair of glass shaping molds having complementary shaping surfaces conforming substantially to the shape desired for the bent glass sheet, said pressurized engagement being provided by means for moving said glass shaping molds between a retracted position and a glass engaging position, and wherein at least one of said glass shaping molds comprises a relatively flexible, solid, continuous shaping plate having a major surface whose shape and areal extent approximates that of the glass sheet after bending, a relatively rigid member located in spaced relation behind said relatively flexible shaping plate, and adjustment means comprising a plurality of attachment members distributed in spaced relation throughout the areal extent of said relatively flexible shaping plate and said relatively rigid member for connecting said plate and said member in spaced relation to one another and to provide said plate with sufficient rigidity to resist deformation during pressurized engagement against a heat-softened glass sheet, said attachment members being individually adjustable in length between said relatively flexible shaping plate and said relatively rigid member for altering the shape of said relatively flexible shaping plate relative to said relatively rigid member, the improvement comprising an aperture in said relatively flexible shaping plate arranged to face a given aperture through said glass sheet, a plug within said shaping plate aperture adapted to engage surface portions of said glass sheet about the perimeter of said glass sheet aperture, a plug attachment member attached to the rear of said plug and extending rearwardly therefrom for attaching said plug to said one of said molds, and adjustment means for adjusting the position of said plug relative to the shaping surface of said shaping plate.

2. The improvement according to claim 1, wherein said plug and said aperture are provided with means for maintaining said plug in a desired orientation relative to its associated aperture.

3. The improvement according to claim 1, wherein said aperture in said relatively flexible metal plate is of approximately circular shape having at least one extension extending outwardly from the periphery of the circular shape and said plug is of approximately circular shape having an extension conforming to the extension from said aperture of said relatively flexible metal plate.

4. The improvement according to claim 3, wherein said plug attachment member comprises an externally threaded rod provided with a pair of adjustment nuts, one of said nuts being disposed in front of said rigid member and the other of said nuts being disposed behind said relatively rigid member.

5. The improvement as in claim 1, wherein each of said glass shaping molds comprises a relatively flexible glass shaping plate, and each shaping plate is provided with an aperture aligned with a corresponding aperture in the shaping plate of said other glass shaping mold, each said aperture of each plate being provided with a said plug, a said plug attachment member and a said adjustment means.

6. The improvement as in claim 5, wherein one of said glass shaping molds has a shaping surface of convex configuration and the other of said glass shaping molds has a shaping surface of concave configuration and each aperture in said shaping plate of said glass shaping mold having said shaping surface of concave configuration is slightly larger than the corresponding aligned aperture in said shaping plate of said glass shaping mold having a convex configuration.

7. Apparatus for press bending an apertured heat-softened glass sheet to a desired shape comprising a press bending member having a shaping surface conforming to that desired for said glass sheet, an aperture in said press bending member arranged to face a given aperture in said glass sheet, a plug within said aperture in said press bending member adapted to engage surface portions of said glass sheet about the perimeter of said glass sheet aperture, a plug attachment member attached to the rear of said plug and extending rearwardly therefrom for attaching said plug to said apparatus, and adjustment means for adjusting the position of said plug relative to said shaping surface.

8. Apparatus as in claim 7, wherein said plug and said aperture in said member are provided with means for maintaining said plug in a desired orientation relative to said latter aperture.

9. Apparatus as in claim 7, further including a second press bending member having a shaping surface complementary to that of said press bending member, an aperture in said second press bending member adapted to be aligned with said other apertures, a plug within said aperture of said second press bending member, a plug attachment member attached to the rear of said latter plug and extending rearwardly therefrom for attaching said latter plug to said apparatus, and adjustment means for adjusting the relative position of said latter plug relative to said shaping surface of said second press bending member.

10. Apparatus as in claim 9, wherein one of said press bending members has a shaping surface of convex configuration and the other of said press bending members has a shaping surface of concave configuration and said aperture in the press bending member having a shaping surface of concave configuration is slightly larger than said aligned aperture in the press bending member having a shaping surface of convex configuration.

* * * * *

UNITED STATES PATENT OFFICE
CERTIFICATE OF CORRECTION

Patent No. 3,819,351  Dated July 16, 1974

Inventor(s)  Paul D. Shaffer; David C. Plank

It is certified that error appears in the above-identified patent and that said Letters Patent are hereby corrected as shown below:

Column 3, Line 6, (Summary of the Present Invention), after "plug attachment", insert --member--.

Column 5, Line 34, (Description of a Preferred Embodiment), after "cold rolled" -- insert "#" (to read as #1018).

Signed and sealed this 8th day of October 1974.

(SEAL)
Attest:

McCOY M. GIBSON JR.
Attesting Officer

C. MARSHALL DANN
Commissioner of Patents